United States Patent [19]

Shimizu et al.

[11] Patent Number: 5,174,407
[45] Date of Patent: Dec. 29, 1992

[54] VARIABLE RATIO STEERING SYSTEM

[75] Inventors: Yasuo Shimizu; Junji Yuzuriha, both of Tochigi, Japan

[73] Assignee: Honda Giken Kogyo Kabushiki Kaisha, Tokyo, Japan

[21] Appl. No.: 755,463

[22] Filed: Sep. 5, 1991

[30] Foreign Application Priority Data

Sep. 6, 1990 [JP] Japan .................... 2-236242

[51] Int. Cl.⁵ .................... B62D 5/04; B62D 1/20; B62D 5/02
[52] U.S. Cl. .................... 180/79.1; 74/499; 180/79; 180/79.3
[58] Field of Search .................... 180/79.1, 140, 79.3; 280/91; 74/499, 388 PS

[56] References Cited

U.S. PATENT DOCUMENTS

| | | | |
|---|---|---|---|
| 4,658,927 | 4/1987 | Kanazawa | 180/79.1 X |
| 4,898,043 | 2/1990 | Bacardit | 74/388 PS |
| 5,031,714 | 7/1991 | Nishimori et al. | 180/140 X |

FOREIGN PATENT DOCUMENTS

| | | | |
|---|---|---|---|
| 0118124 | 12/1974 | Japan | 280/79.1 |
| 0136373 | 5/1990 | Japan | 280/91 |

Primary Examiner—Charles A. Marmor
Assistant Examiner—Florian Zeender
Attorney, Agent, or Firm—Armstrong & Kubovcik

[57] ABSTRACT

A variable ratio steering system on a motor vehicle can vary the ratio of the angle through which the steerable road wheels are steered to the angle through which the steering wheel is turned by the driver. The variable ratio steering system includes an input shaft coupled to the steering wheel, a first ball screw mechanism including a first nut threaded through balls over the input shaft, an output shaft coupled to the steerable road wheels, a second ball screw mechanism including a second nut threaded through balls over the output shaft, and a steering angle ratio adjusting mechanism, mechanically coupled to the first and second nuts, for varying the ratio of an axial displacement of the second nut to an axial displacement of the first nut. The steering angle ratio adjusting mechanism includes a swing member swingable in a direction substantially parallel to the input and output shafts about an axis lying in a plane transverse to the input and output shafts, the first and second nuts being coupled to respective different portions of the swing member. The steering angle ratio adjusting mechanism varies the distance between the axis about which the swing member is swingable and at least one of the different portions to which the first and second nuts are coupled.

16 Claims, 12 Drawing Sheets

VARIABLE RATIO STEERING SYSTEM

BACKGROUND OF THE INVENTION

1. Field of the Invention

The present invention relates to a variable ratio steering system capable of varying the ratio (steering angle ratio) of the angle through which steerable road wheels are steered to the angle through which a steering wheel is turned by the driver.

2. Description of the Prior Art

One conventional variable ratio steering mechanism for use in a motor vehicle is disclosed in U.S. Pat. No. No. 4,658,927, for example. The disclosed variable ratio steering mechanism includes a planetary gear mechanism disposed in a steering force transmitting path between a steering wheel and a steering gear mechanism. The planetary gear mechanism comprises a sun gear coupled to the steering wheel, a ring gear coupled to the steering gear mechanism, and a carrier coupled to a motor. The motor actuates the carrier depending on the speed of the motor vehicle to vary the steering angle ratio.

In the known variable ratio steering mechanism, the sun gear, the carrier, and the ring gear are rotatable independently of each other. Therefore, it is difficult to put the neutral position of the steering wheel in conformity with the neutral position of the steerable road wheels. If the motor malfunctions, particularly if the motor remains energized out of control, then the carrier is actuated to steer the steerable road wheels even without the steering wheel being turned by the driver.

SUMMARY OF THE INVENTION

In view of the aforesaid difficulties of the conventional variable ratio steering mechanism, it is an object of the present invention to provide a variable ratio steering system which can easily place the neutral positions of a steering wheel and steerable road wheels into conformity with each other, and which is highly reliable in operation.

According to the present invention, there is provided a variable ratio steering system on a motor vehicle having a steering wheel and steerable road wheels, comprising an input shaft coupled to the steering wheel, the input shaft having a first threaded section, a first ball screw mechanism including a first nut threaded through balls over the first threaded section, an output shaft coupled to the steerable road wheels, the output shaft having a second threaded section, a second ball screw mechanism including a second nut threaded through balls over the second threaded section, and steering angle ratio adjusting means, mechanically coupled to the first and second nuts, for varying the ratio of an axial displacement of the second nut to an axial displacement of the first nut.

The steering angle ratio adjusting means includes a swing member swingable in a direction substantially parallel to the input and output shafts about an axis lying in a plane transverse to the input and output shafts, the first and second nuts being coupled to respective different portions of the swing member, the steering angle ratio adjusting means comprising means for varying the distance between the axis about which the swing member is swingable and at least one of the different portions to which the first and second nuts are coupled.

When the steering wheel is turned, the input shaft is rotated to axially displace the first nut of the first ball screw mechanism that is threaded over the first threaded section of the input shaft. In response to the axial displacement of the first nut, the second nut of the second ball screw mechanism, which is coupled to the first nut through the swing member, is also axially displaced thereby rotating the second threaded section of the output shaft, thereby transmitting steering forces to the steerable road wheels. The portion of the swing member to which the nut of at least one of the first and second ball screw mechanisms is coupled is positionally adjusted to vary the ratio of the axial displacement of the second nut to the axial displacement of the first nut, i.e., the ratio of the steering angle of the steerable road wheels to the steering angle of the steering wheel. The variable ratio steering system can hold the neutral positions of the steering wheel and the steerable road wheels in conformity with each other at all times, and also can transmit steering forces reliably from the steering wheel to the steerable road wheels for reliable steering operation.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Like or corresponding parts are denoted by like or corresponding reference numerals throughout views.

FIGS. 1 through 9 show a variable ratio steering system according to a first embodiment of the present invention, for use in a motor vehicle.

Figure 1:
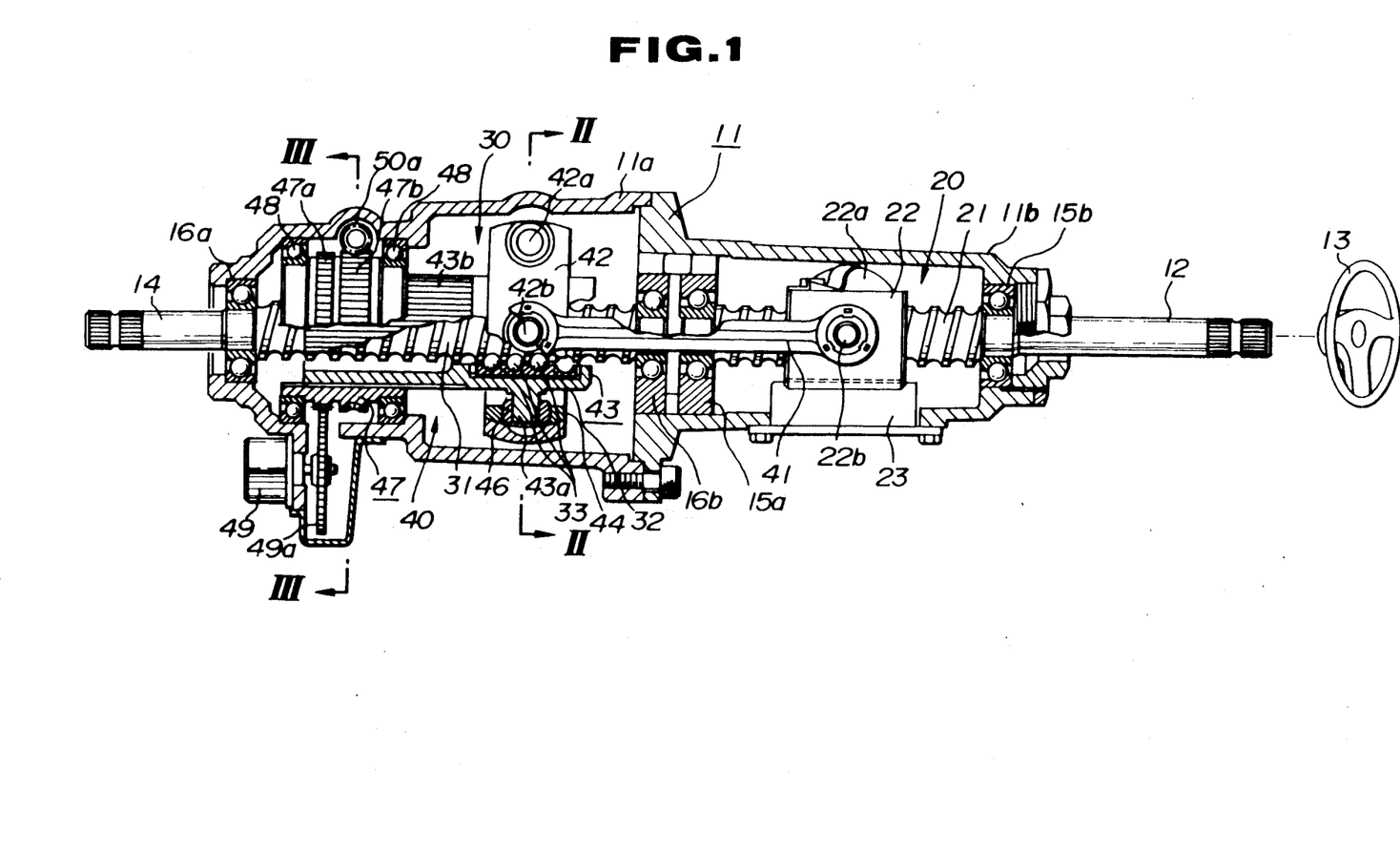
FIG. 1 is a cross-sectional view, partly in front elevation, of a variable ratio steering system according to a first embodiment of the present invention.

As shown in FIG. 1, a case 11 comprises two case members 11a, 11b joined to each other, and an input shaft 12 coupled to a steering wheel 13 extends out of one end of the case 11. An output shaft 14 that is coupled to a rack-and-pinion steering gear mechanism (not shown) extends from the opposite end of the case 11. The steering gear mechanism is operatively coupled to steerable road wheels. The input shaft 12 is rotatably supported in the righthand portion, i.e., the case member 11b, of the case 11 by a pair of bearings 15a, 15b, and the output shaft 14 is rotatably supported in the lefthand portion, i.e., the case member 11a, of the case 11 by a pair of bearings 16a, 16b. The case 11 houses therein a first ball screw mechanism 20, a second ball screw mechanism 30, and a steering angle ratio adjusting mechanism 40. The input shaft 12 and the output shaft 14 are coaxially coupled to each other through these mechanisms 20, 30, 40.

The first ball screw mechanism 20 comprises a nut 22 relatively rotatably threaded through a number of balls (not shown) over a threaded section 21 of the input shaft 12 in the case member 11b. The nut 22 has an outer circumferential portion that is axially slidably fitted in a key 23 that is fixed to an inner wall surface of the case member 11b. To an upper portion of the nut 22, there is fixed a ball circulating tube 22a for guiding balls from one end of the nut 22 into the opposite end of the nut 22. The nut 22 has a pair of trunnions 22b (only one shown) on outer surfaces thereof, the trunnions 22b extending perpendicularly to the sheet of FIG. 1. The steering angle ratio adjusting mechanism 40 has a pair of connecting rods 41 swingably connected to the trunnions 22b, respectively. When the threaded section 21 of the input shaft 12 rotates about its own axis, the nut 22 of the first ball screw mechanism 20 is axially moved along the threaded section 21. Conversely, when the nut 22 axially moves along the threaded section 21, the threaded section 21 is rotated about its own axis.

The second ball screw mechanism 30 also comprises a nut 32 relatively rotatably threaded through a number of balls 33 over a threaded section 31 of the output shaft 14 in the case member 11a. The nut 32 is only axially movable with respect to the case member 11a. To an upper portion of the nut 32, there is fixed a ball circulating tube 32a (see FIG. 2) for guiding balls 33 from one end of the nut 32 into the opposite end of the nut 32. The nut 32 has a guide (not shown) for guiding the nut 32 to move axially with respect to the case member 11a. The guide of the nut 32 is held in slidable engagement with the case member 11a for preventing the nut 32 from rotating with respect to the case member 11a. When the nut 32 axially moves along the output shaft 14, the output shaft 14 is rotated about its own axis, and when the output shaft 14 rotates about its own axis, the nut 32 is axially moved along the output shaft 14.

Figures 2, 3:
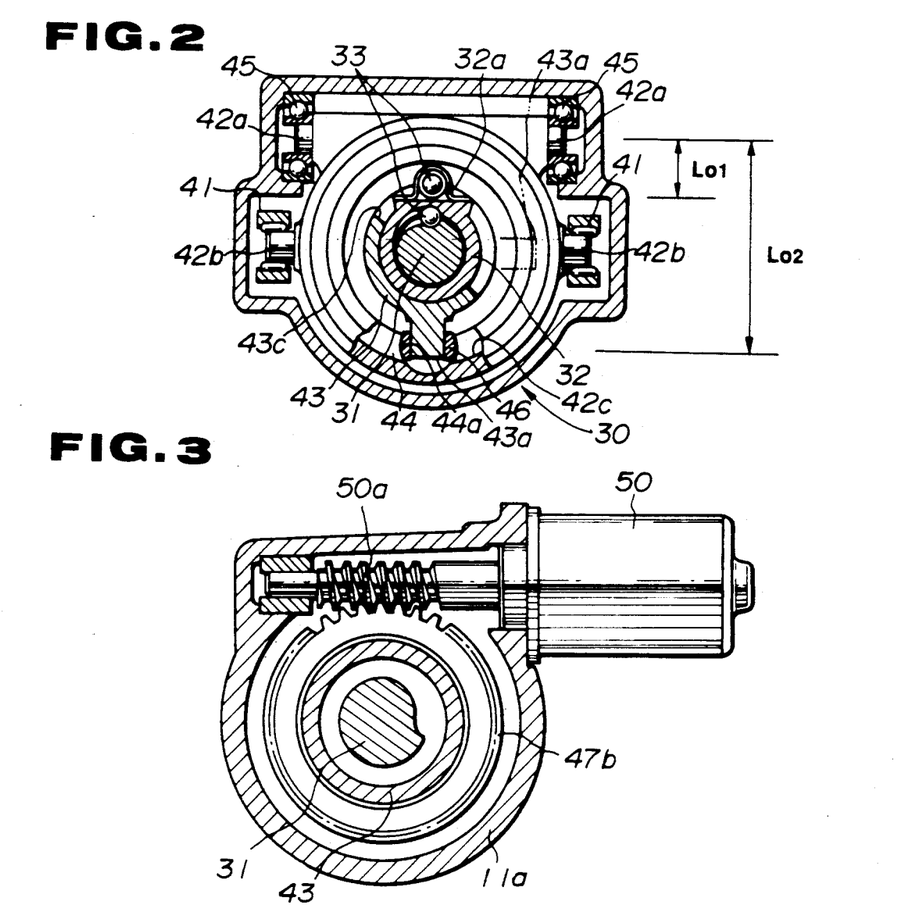
FIG. 2 is a cross-sectional view taken along line II—II of FIG. 1.
FIG. 3 is a cross-sectional view taken along line III—III of FIG. 1.

The steering angle ratio adjusting mechanism 40 comprises a ring-shaped swing member 42 supported in the case member 11a for swinging movement in a direction substantially parallel to the input and output shafts 12, 14, and an adjusting cylinder 43 disposed radially inwardly of the swing member 42 and concentrically about the nut 32 of the second ball screw mechanism 30, the adjusting cylinder 43 being rotatable relatively to and axially movable in unison with the nut 32. As shown in FIG. 2, the swing member 42 is of a substantially annular shape and has a guide groove 42c defined in its inner surface for allowing a plain bearing 44 to move circumferentially therein. The swing member 42 has a pair of support shafts 42a projecting outwardly from its upper potion and a pair of pins 42b projecting outwardly from its central portion. The support shafts 42a and the pins 42b lie in a plane that extends transversely across the threaded portion 31 of the output shaft 14. The plain bearing 44 is circumferentially slidably disposed in the guide groove 42c. The swing member 42 is swingably supported by bearings 45 disposed in an upper portion of the case member 11a, the support shafts 42a being rotatably supported in the respective bearings 45. The connecting rods 41 have ends connected to the pins 42b, respectively. The other ends of connecting rods 41 are coupled respectively to the trunnions 22b of the nut 22, so that the swing member 42 and the nut 22 are operatively coupled to each other by the connecting rods 41. The plain bearing 44 has one spherical recess 44a in which there is rotatably disposed a bushing 46 that has a spherical surface snugly held against the spherical surface of the recess 44a. The bushing 46 is fitted over a guide pin 43a integrally projecting outwardly from the adjusting cylinder 43.

Figure 4:
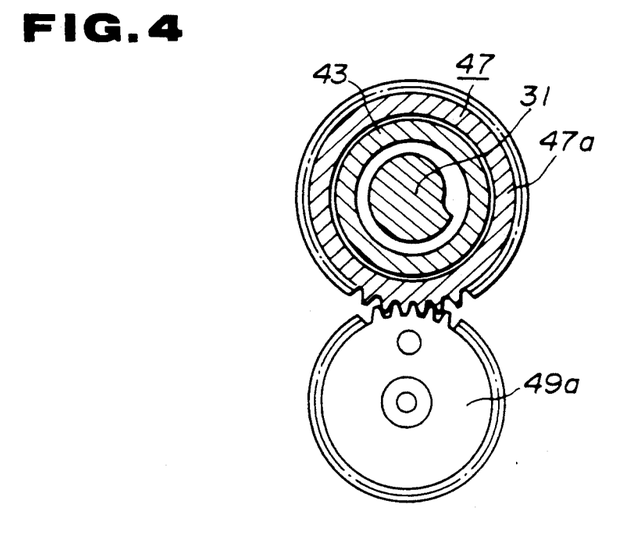
FIG. 4 is a cross-sectional view, partly in side elevation, of meshing gears through which a steering angle ratio adjusting mechanism and a steering angle ratio sensor are mechanically connected to each other in the variable ratio steering system shown in FIG. 1.

The guide pin 43a of the adjusting cylinder 43, which engages plain bearing 44 through the spherical bushing 46, is disposed on an outer surface of the adjusting cylinder 43 in an axial position aligned with the nut 32. The adjusting cylinder 43 has serrations 43b on its outer circumferential surface on the lefthand side (FIG. 1) of the nut 32. The serrations 43b are fitted in a tubular member 47 for axial movement relative thereto and rotation in unison therewith. In FIG. 2, the adjusting cylinder 43 has a recess 43c to avoid physical interference with the tube 32a of the nut 32. The tubular member 47 is rotatably supported in the case member 11a by a pair of bearings 48 (FIG. 1), and has a detecting gear 47a on its lefthand outer circumferential surface and a worm wheel 47b on its righthand outer circumferential surface. As also shown in FIG. 4, the detecting gear 47 is held in mesh with a gear 49a fixed to the rotatable shaft of a steering angle ratio sensor 49. As shown in FIG. 3, the worm wheel 47b is held in mesh with a worm 50a fixed to the rotatable shaft of a drive motor 50. The tubular member 47 can be rotated by the drive motor 50, and the angular displacement of the tubular member 47 can be detected by the steering angle ratio sensor 49.

Figure 7:
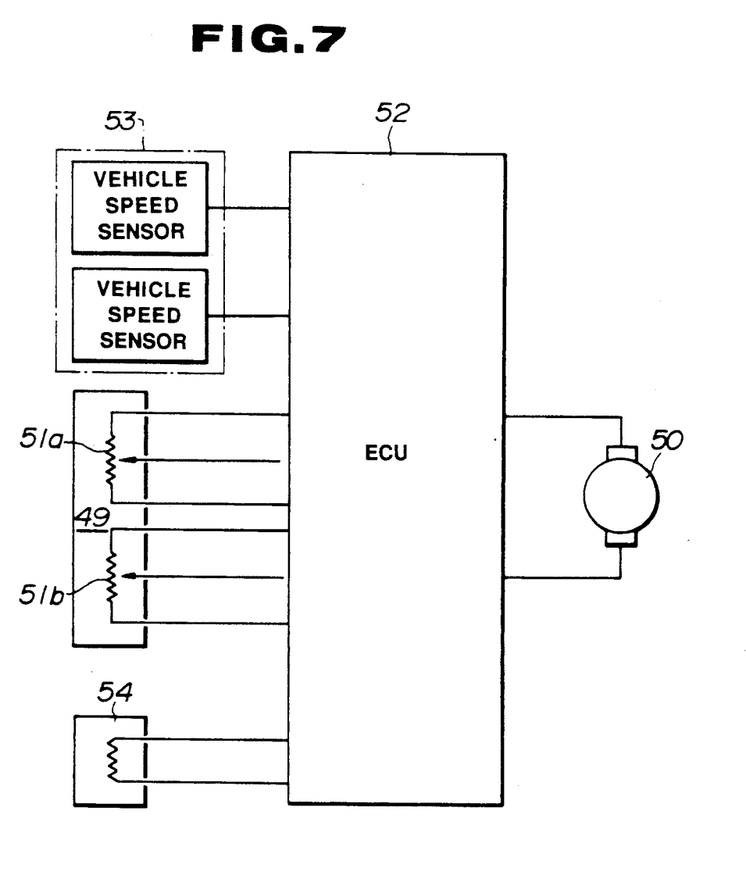
FIG. 7 is a block diagram of a control system for the steering angle ratio adjusting mechanism.

As shown in FIG. 7, the steering angle ratio sensor 49 has two potentiometers 51a, 51b whose resistances are variable depending on the angular displacement of the tubular member 47, the potentiometers 51a, 51b being electrically connected to a controller 52. The steering angle ratio sensor 49 applies a detected signal to the controller 52, the detected signal indicating the angular displacement of the tubular member 47 as a voltage drop across the potentiometers 51a, 51b. The controller 52 comprises a microcomputer (ECU) or the like. To the controller 52, there are electrically connected the drive motor 50, vehicle speed sensors 53, and a current sensor 54. The current sensor 54 detects the value of an electric current supplied to the drive motor 50, and applies the detected signal to the controller 52. The vehicle speed sensors 53 detect the speed of the motor vehicle, and apply the detected signal to the controller 52.

Now, operation of the variable ratio steering system according to the first embodiment will be described below.

When the input shaft 12 is rotated by the steering wheel 13, the nut 22 of the first ball screw mechanism 20 axially moves, causing the connecting rods 41 to swing the swing member 42 thereby to move the adjusting cylinder 43 axially. Therefore, the nut 32 of the second ball screw mechanism 30 axially moves in unison with the adjusting member 43. The threaded section 31, i.e., the output shaft 14 is therefore rotated about its own axis, for transmitting the steering forces to the steering gear mechanism coupled to the output shaft 14.

When the steering wheel 13 is turned from a neutral position to a certain angle, the input shaft 12 rotates and also the output shaft 14 rotates, steering the steerable road wheels from a neutral position to a certain angle at a steering angle ratio that is set by the steering angle ratio adjusting mechanism 40. When the steering wheel 13 is returned to the neutral position, the input and output shafts 12, 14 rotate back, bringing the steerable road wheels back to the neutral position. Consequently, the neutral position of the steering wheel 13 and the neutral position of the steerable road wheels are always held in conformity with each other.

Figure 5:
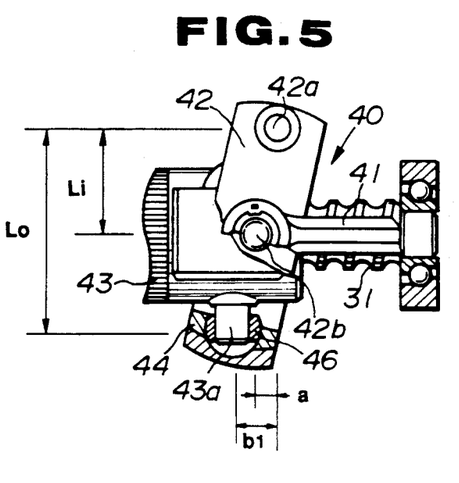
FIGS. 5 and 6 are sectional front elevational views showing the manner in which the steering angle ratio adjusting mechanism operates.

The steering angle ratio is adjusted by the steering angle ratio adjusting mechanism 40 as follows: When the adjusting cylinder 43 is angularly moved by the drive motor 50, the guide pin 43a of the adjusting cylinder 43 is also angularly moved with the plan bearing 44 as it slides circumferentially along the recess 42c (see the chained line in FIG. 2). Therefore, the vertical distance between the support shafts 42a about which the swing member 42 is swingable and the guide pin 43a, i.e., the radius of swinging movement of the swing member 42 (hereinafter referred to as an "output arm length Lo"), is varied, thereby varying the ratio of the angle through which the swing member 42 swings, the angle being governed by the distance by which the nut 22 of the first ball screw mechanism 20 axially moves, to the distance by which the adjusting cylinder 43 axially moves. Stated otherwise, as shown in FIG. 5, the vertical distance (hereinafter referred to as an "input arm length Li") from the support shafts 42a of the swing member 42 to the pins 42b coupled to the connecting rods 41 remains constant, but the output arm length Lo varies between distances Lo1, Lo2 (see FIG. 2). Therefore, the ratio of the distance by which the nut 32 axially linearly moves to the distance by which the nut 22 axially linearly moves varies, thereby varying the steering angle ratio. More specifically, for example, if the guide pin 43a is in the lowermost position as indicated by the solid line in FIG. 2, then when the nut 22 of the first ball screw mechanism 20 axially moves by a distance a (FIG. 5), the swing member 42 swings about the support shafts 42a through a relatively large angle, axially moving the adjusting cylinder 43 together with the nut 32 of the second ball screw mechanism 30 by a distance b1. At this time, the distance b1 is relatively large (b1>a) because the ratio Lo/Li is relatively large.

Figure 6:
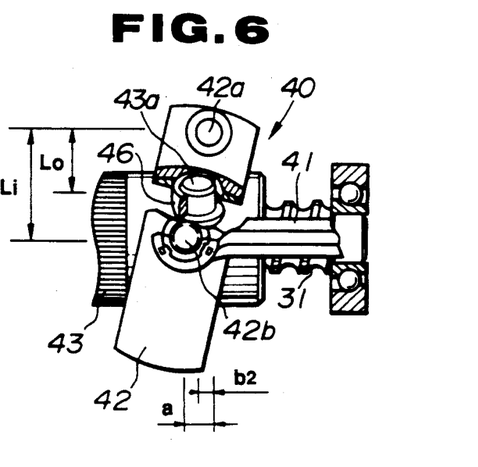

If the guide pin 43a is in an upper position as indicated by the chained line in FIG. 2, then since the output arm length Lo is reduced as shown in FIG. 6 and hence the ratio Lo/Li is also reduced, the swing member 42 swings about the support shafts 42a through a relatively small angle and the nut 32 axially moves by a relatively small distance b2 (b2<b1, b2<a) in response to the movement of the nut 22 by the distance a. Consequently, the steering angle ratio is varied.

Figures 8, 9:
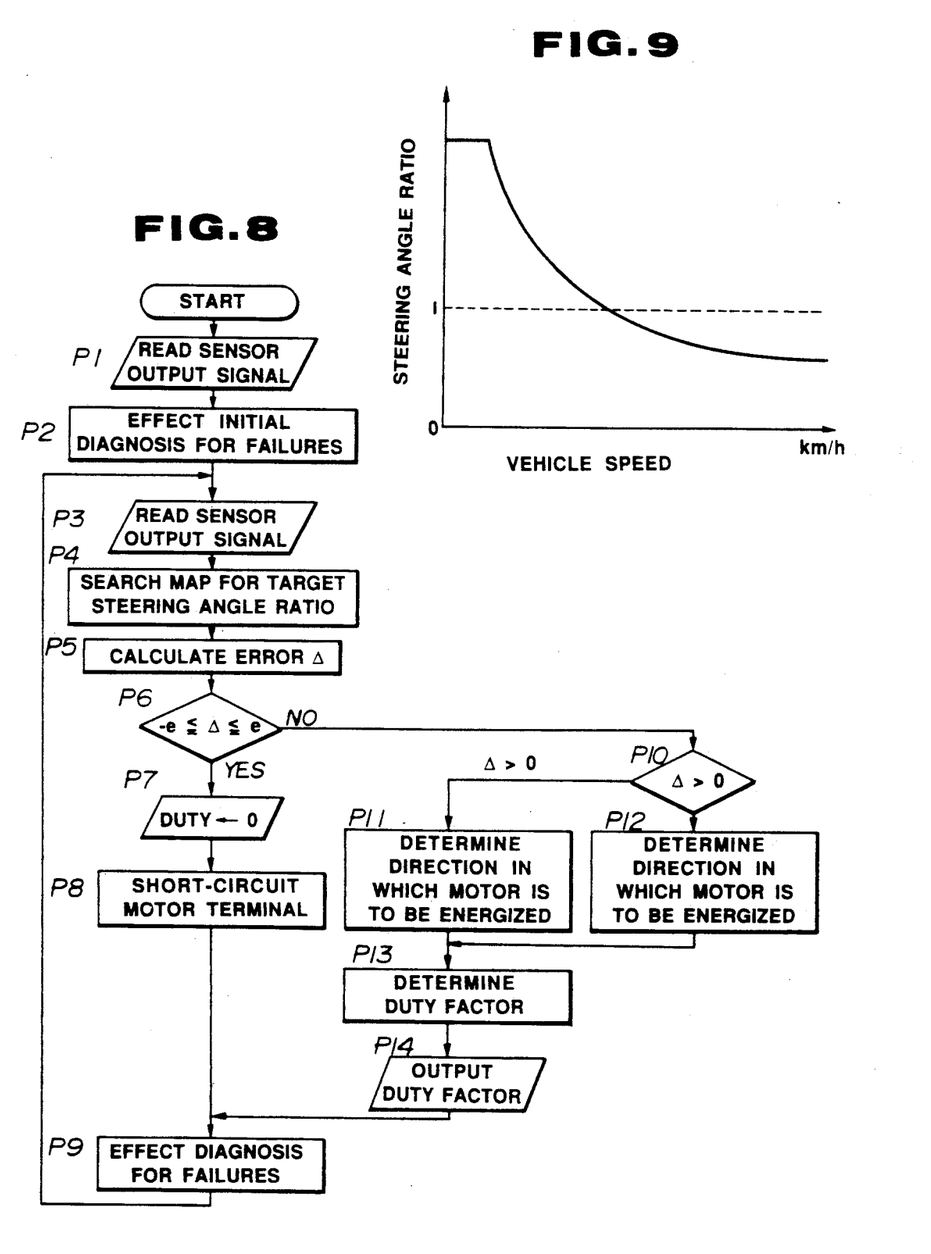
FIG. 8 is a flowchart of a control program for a control process to be carried out by the control system shown in FIG. 7.
FIG. 9 is a graph showing a data table used in the control process.

The variable ratio steering system controls the steering angle ratio by energizing the drive motor 50 with the controller 52 which repeatedly executes a control process shown in FIG. 8. As shown in FIG. 8, when the power supply of the variable ratio steering system is turned on by an ignition key switch, the variable ratio steering system is initialized, and then the controller 52 reads output signals from the sensors 49, 53, 54 in a step P1. Then, the controller 52 effects an initial diagnosis on the system for failures in a step P2. If a system failure is detected in the initial diagnosis, the controller 52 energizes a warning lamp or the like, sets a failure flag, and inhibits energization of the drive motor 50. Only if the system is found normal in the initial diagnosis, control goes to a step P3.

In the step P3, the controller 52 reads the output signals from the sensors 49, 53, 54 again. Then, the controller 52 searches a data table or map shown in FIG. 9 for a target steering angle ratio corresponding to the vehicle speed in a step P4. In a next step P5, the controller 52 calculates the difference or error $\Delta$ between the target steering angle ratio and an actual steering angle ratio that is detected by the steering angle ratio sensor 49. The magnitude of the calculated error $\Delta$ is determined in a step P6. If the absolute value of the error $\Delta$ is equal to or smaller than a predetermined value e in the step P6, then control goes to a step P7. If the absolute value of the error $\Delta$ is greater than the predetermined value e, then control goes to a step P10.

In the step P7, the controller 52 applies a command signal that makes zero the duty factor of an electric current to be supplied to the drive motor 50, to a motor driver circuit for the drive motor 50. Then, the controller 52 short-circuits the terminals of the drive motor 50 in a step P8, and effects a diagnosis on the system for failures in a step P9. In the step P9, as in the step P2, if a system failure is detected in the diagnosis, the controller 52 energizes the warning lamp or the like, sets a failure flag, and inhibits energization of the drive motor 50. If the system is found normal in the diagnosis, control goes back to the step P3 to repeat the above steps.

The step P10 determines whether the error $\Delta$ is positive or negative. Depending on whether the error $\Delta$ is positive or negative, the controller 52 determines the direction in which the drive motor 50 is to be energized (i.e., the positive direction or the negative direction) in a step P11 or P12. In a next step P13, the controller 52 determines a duty factor for the current to be supplied to the drive motor 50 depending on the error $\Delta$, by searching a data table or map. The controller 52 then applies a command signal that represents the determined duty factor to the motor driver circuit in a step P14. Thereafter, control goes from the step P14 to the step P9 for the system diagnosis.

With the variable ratio steering system according to the above embodiment, as shown in FIG. 9, the steering angle ratio is controlled depending on the vehicle speed such that the steering angle ratio is smaller as the vehicle speed is lower, and is larger as the vehicle speed is higher. Therefore, the motor vehicle can be steered easily to make smaller turns in a lower vehicle speed range, and can run highly stably in a higher vehicle speed range.

FIGS. 10 through 14 show a variable ratio steering system according to a second embodiment of the present invention.

Figure 10:
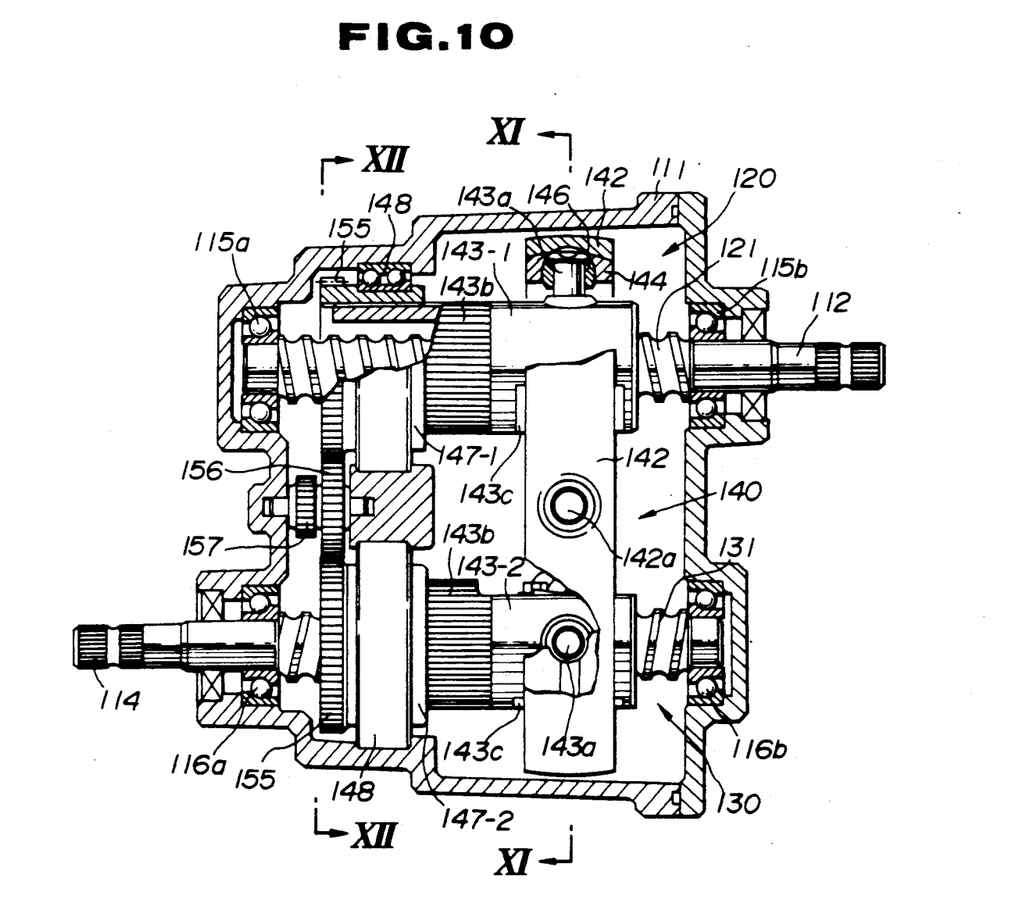
FIG. 10 is a cross-sectional view, partly in front elevation, of a variable ratio steering system according to a second embodiment of the present invention.
Figure 11:
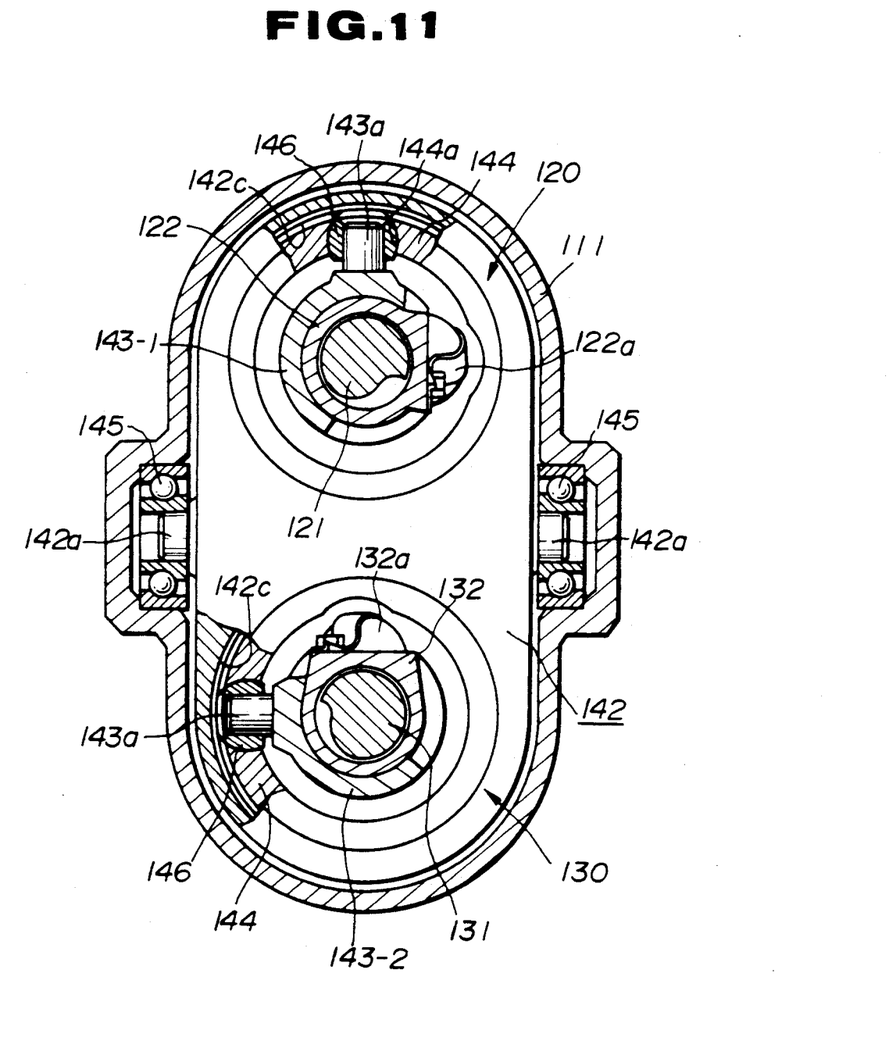
FIG. 11 is a cross-sectional view taken along line XI—XI of FIG. 10.

As shown in FIG. 10, input and output shafts 112, 114 are rotatably supported on a case 111 parallel to each other. As shown in FIGS. 10 and 11, a steering angle ratio adjusting mechanism 140 in the case 111 has a first adjusting cylinder 143-1 and a second adjusting cylinder 143-2. The first adjusting cylinder 143-1 engages a nut 122 of a first ball screw mechanism 120 for axial movement in unison therewith and rotation relative thereto. The second cylinder 143-2 engages a nut 132 of a second ball screw mechanism 130 for axial movement in unison therewith and rotation relative thereto.

More specifically, as shown in FIG. 11, a swing member 142 is of an elliptical shape as viewed in side elevation, and has a pair of support shafts 142a projecting outwardly transversely from a longitudinal central region thereof. The swing member 142 also has guide grooves 142c defined around the adjusting cylinders 143-1, 143-2, respectively, and receiving respective plain bearings 144 that facilitate angular movement of guide pins 143a, respectively, projecting from the adjusting cylinders 143-1, 143-2. The swing member 142 is swingably supported in the case 111 by the support shafts 142a that are rotatably supported by respective bearings 145 mounted in the case 111. The plain bearings 144 received in the respective guide grooves 142c have respective spherical recesses 144a in which the guide pins 143a are fitted through respective bushings 146. When the adjusting cylinders 143-1, 143-2 are angularly moved about the input and output shafts 112, 114, the guide pins 143a are angularly moved with the plain bearings 144 as they slide along the guide grooves 142c. Therefore, the vertical distances from the support shafts 142a to the guide pins 143a are varied.

Figure 12:
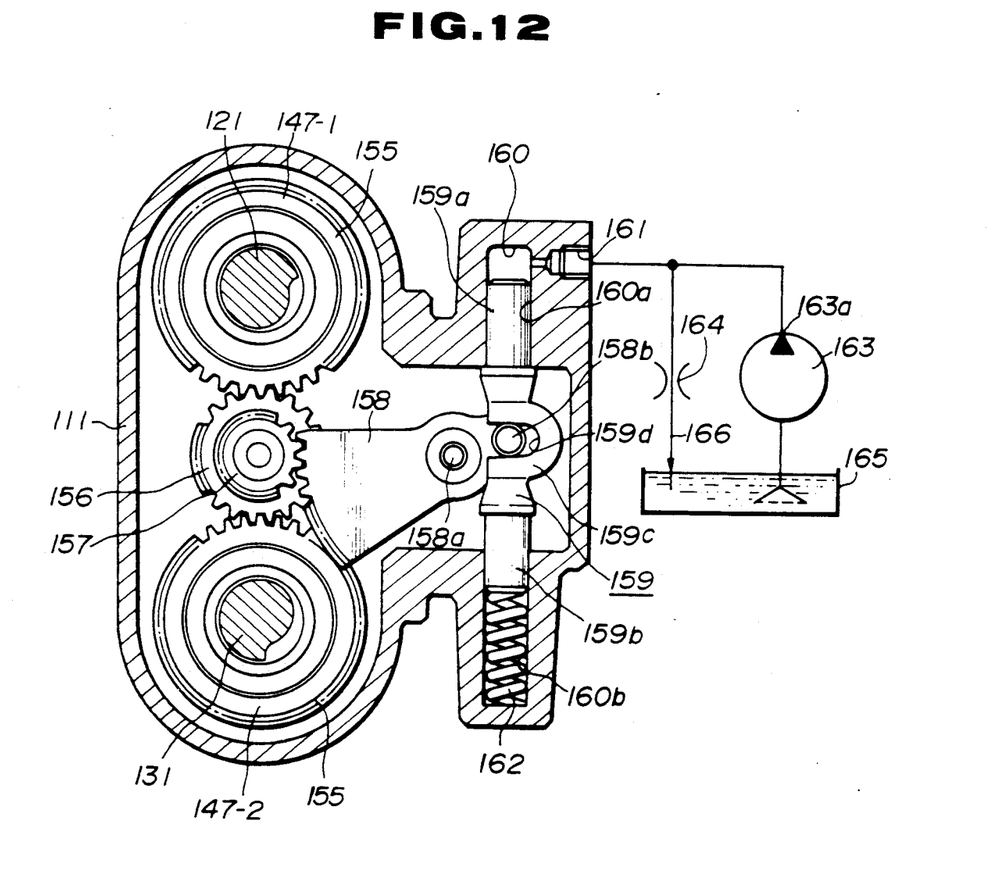
FIG. 12 is a cross-sectional view taken along line XII—XII of FIG. 10.

Tubular members 147-1, 147-2 are rotatably supported in the case 111 by respective bearings 148, and have gears 155 on their lefthand ends (see FIG. 10). The gears 155 are held in mesh with a gear 156 (see also FIG. 12) positioned therebetween. The gear 156 is integral with a coaxial gear 157 that is held in mesh with a sector gear 158). As shown in FIG. 12, the sector gear 158 has a support shaft 158a rotatably supported by the case 111, and also has a pin 158b on its righthand end remote from its teeth. The pin 158b is held in engagement with a drive rod 159 that is axially movable. When the pin 158b is moved by the drive rod 159, the sector gear 158 is angularly moved to cause the gears 156, 157 to rotate the tubular members 147-1, 147-2 in mutually opposite directions.

The drive rod 159 has a pair of pistons 159a, 159b on its opposite ends and an arch 159c on its intermediate portion, the arch 159c having a U-shaped groove 159d. The pin 158b of the sector gear 158 is movably fitted in the groove 159d of the arch 159c. The pistons 159a, 159b are slidably fitted in respective cylinders 160a, 160b defined in the case 111. The piston 159a defines in the cylinder 160a an oil chamber 160 held in communication with a port 161. A spring 162 is disposed under compression between the piston 159b and the bottom of the cylinder 160b for normally urging the piston 159b upwardly (FIG. 12) in a direction to push the other piston 159a into the cylinder 160a.

The port 161 communicates with an outlet port 163a of an oil pump 163, and also with a return passage 166 connected to a reservoir tank 165 through a restriction 164. Therefore, the port 161 is supplied with oil pressure from the oil pump 163. The oil pump 163 is driven by a motor or the engine of the motor vehicle for discharging oil under pressure from reservoir tank 165 at a rate proportional to the speed of the motor vehicle. The oil pump 163 may alternatively be driven by the input shaft of a differential mechanism between drive road wheels of the motor vehicle or the output shaft of a transmission on the motor vehicle, so that the oil pump 163 discharges oil under pressure at a rate commensurate with the speed of the motor vehicle.

Figure 13:
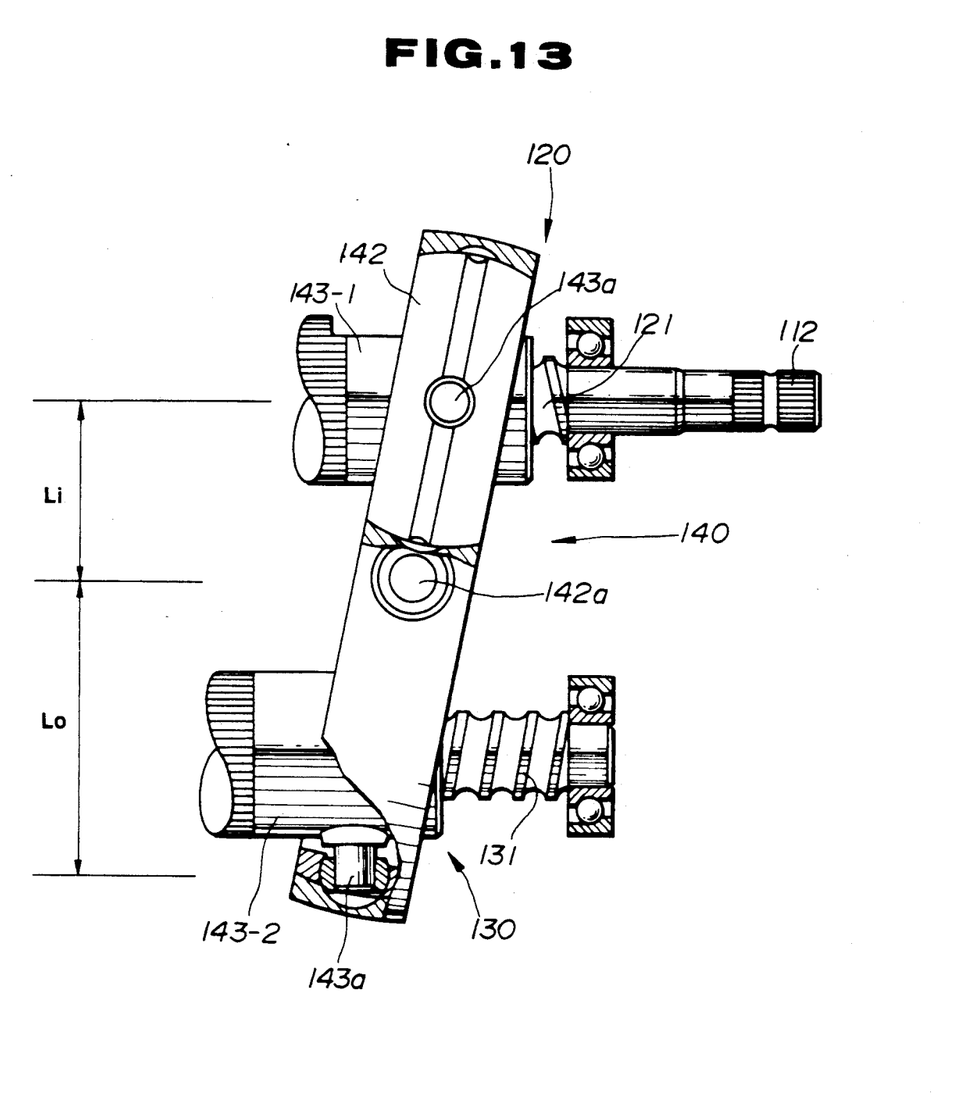
FIGS. 13 and 14 are sectional front elevational views showing the manner in which a steering angle ratio adjusting mechanism in the variable ratio steering system shown in FIG. 10 operates.
Figure 14:
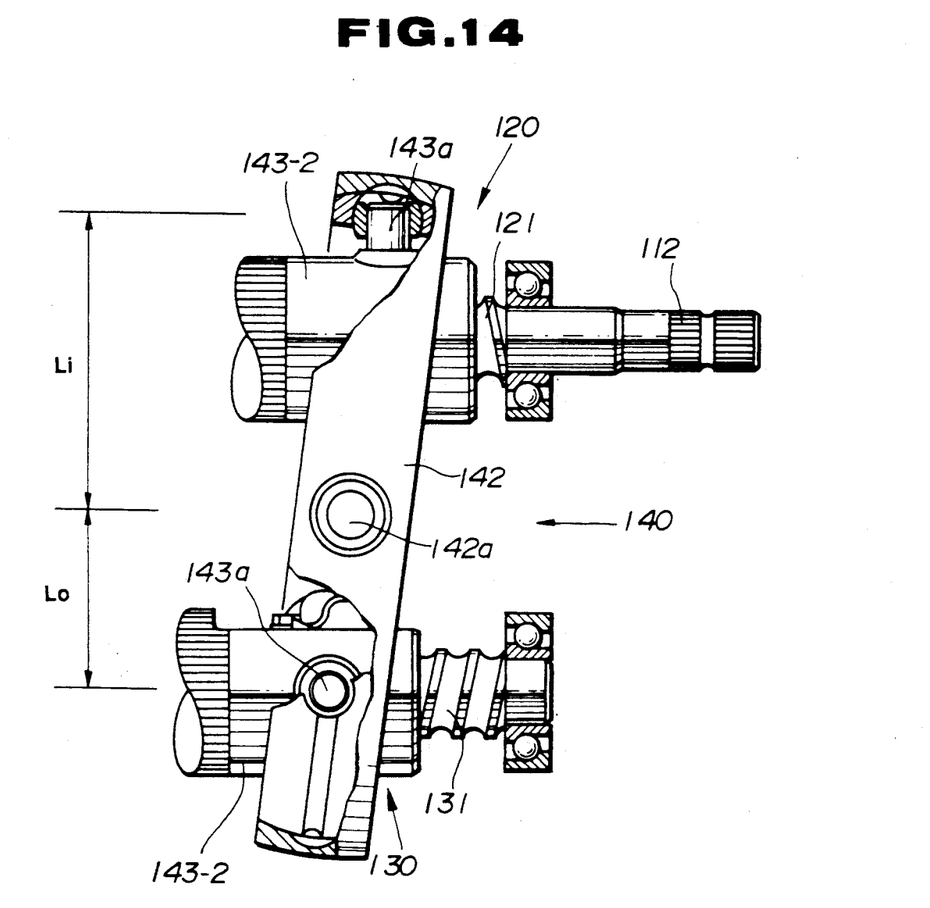

Since the oil pump 163 discharges oil under pressure at a rate proportional to the speed of the motor vehicle and the return passage 166 has the restriction 164, the port 161 and hence the oil chamber 160 are supplied with a lower oil pressure when the vehicle speed is lower and with a higher oil pressure when the vehicle speed is higher. Consequently, the drive rod 159 is axially displaced depending on the vehicle speed such that it is axially displaced a smaller distance when the vehicle speed is lower and a greater distance when the vehicle speed is higher. In response to the axial displacement of the drive rod 159, the sector gear 158 is angularly moved, rotating the tubular members 147-1, 147-2 and hence the adjusting cylinders 143-1, 143-2 in opposite directions. Therefore, the guide pins 143a of the adjusting cylinders 143-1, 143-2 are angular moved with the plan bearings 144 as they slide circumferentially along the grooves 142c in the swing member 142. Accordingly, the vertical distances from the support shafts 142a of the swing member 142 to the guide pins 143a, i.e., input and output arm lengths Li, Lo (see FIG. 13), are varied. If the output arm length Lo from the support shafts 142a to the guide pin 143a of the second adjusting cylinder 143-2 is adjusted to be greater than the input arm length Li from the support shafts 142a to the guide pin 143a of the first adjusting cylinder 143-1 in a lower vehicle speed range, as shown in FIG. 13, then the displacement of the nut 122 of the first ball screw mechanism 120 in response to turning movement of the steering wheel 113 is magnified and transmitted to the nut 132 of the second ball screw mechanism 130 for a greater steering angle ratio. Conversely, if the input arm length Li from the support shafts 142a to the guide pin 143a of the first adjusting cylinder 143-1 is adjusted to be greater than the output arm length Lo from the support shafts 142a to the guide pin 143a of the second adjusting cylinder 143-2 in a higher vehicle speed range, as shown in FIG. 14, then the displacement of the nut 122 of the first ball screw mechanism 120 in response to turning movement of the steering wheel 113 is reduced and transmitted to the nut 132 of the second ball screw mechanism 130 for a smaller steering angle ratio.

The initial biasing force of the spring 162 may be of a relatively large magnitude to prevent the drive rod 159 from being displaced in a low vehicle speed range lower than a predetermined vehicle speed, so that a certain constant steering angle ratio can be maintained in that low vehicle speed range.

FIGS. 15 through 18 illustrate a variable ratio steering system according to a third embodiment of the present invention.

Figure 15:
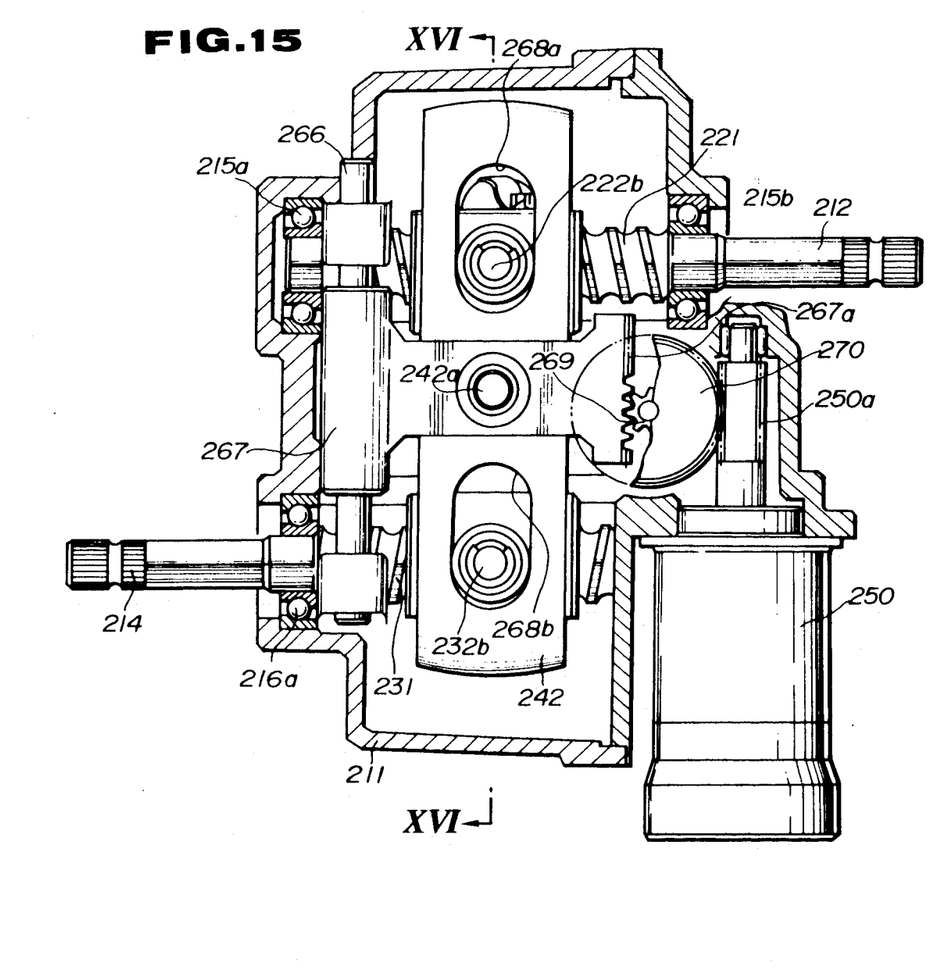
FIG. 15 is a cross-sectional view, partly in front elevation, of a variable ratio steering system according to a third embodiment of the present invention.
Figure 16:
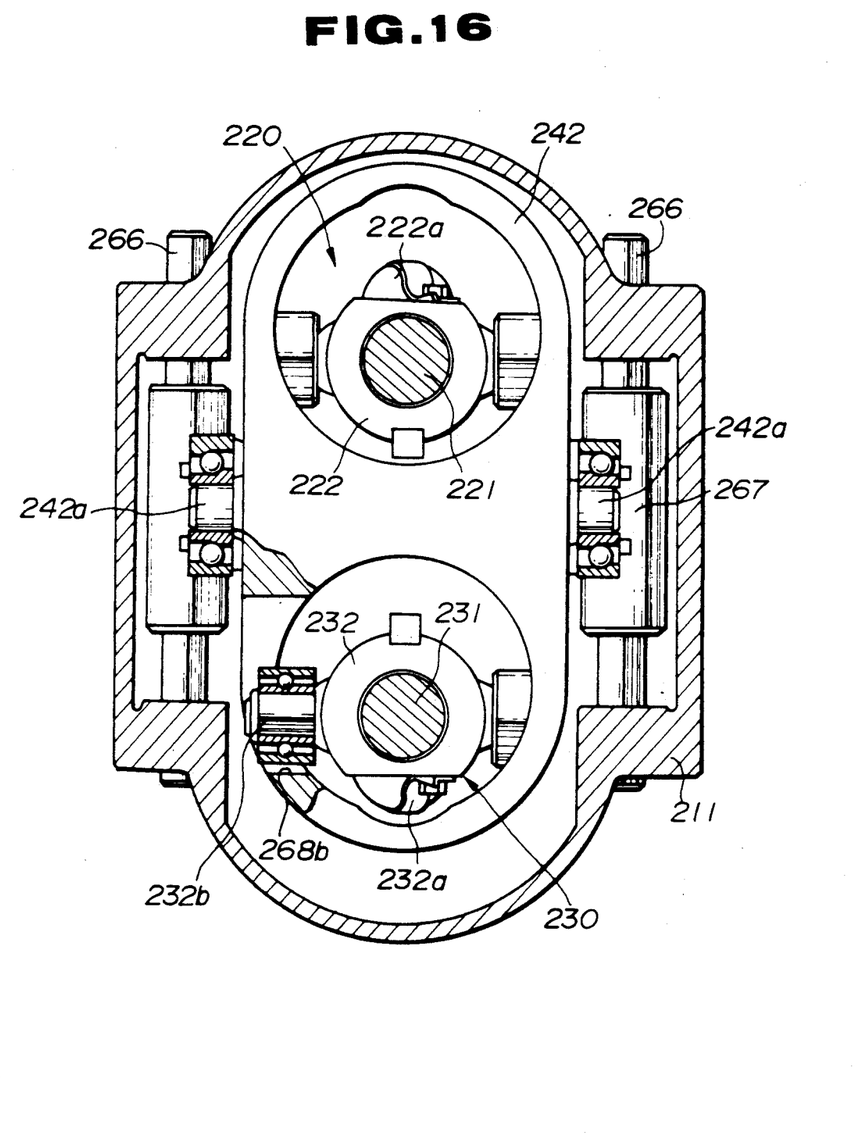
FIG. 16 is a cross-sectional view taken along line XVI—XVI of FIG. 15.
Figure 17:
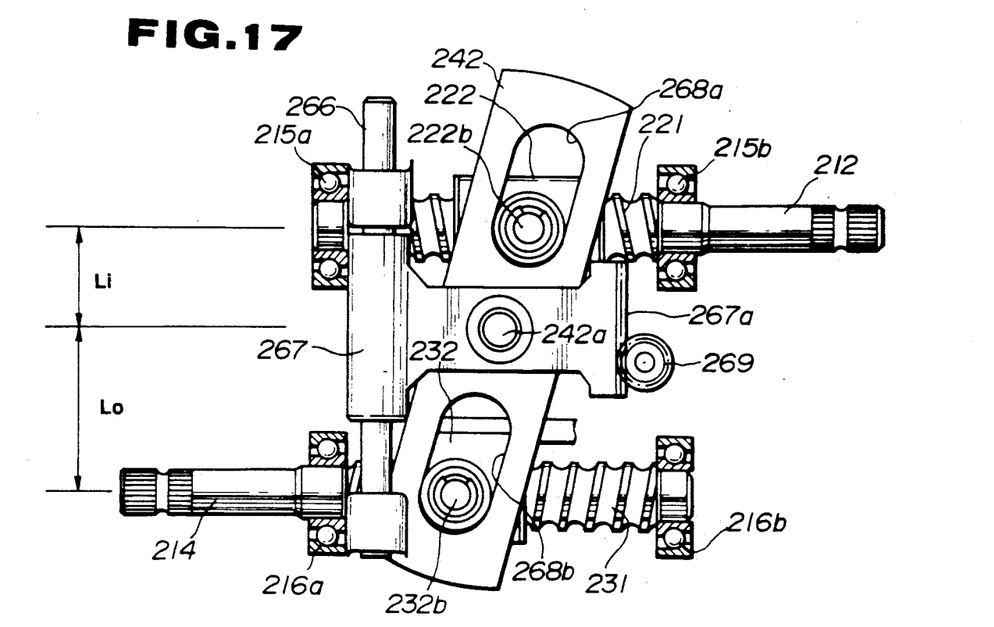
FIGS. 17 and 18 are sectional front elevational views showing the manner in which a steering angle ratio adjusting mechanism in the variable ratio steering system shown in FIG. 15 Operates.
Figure 18:
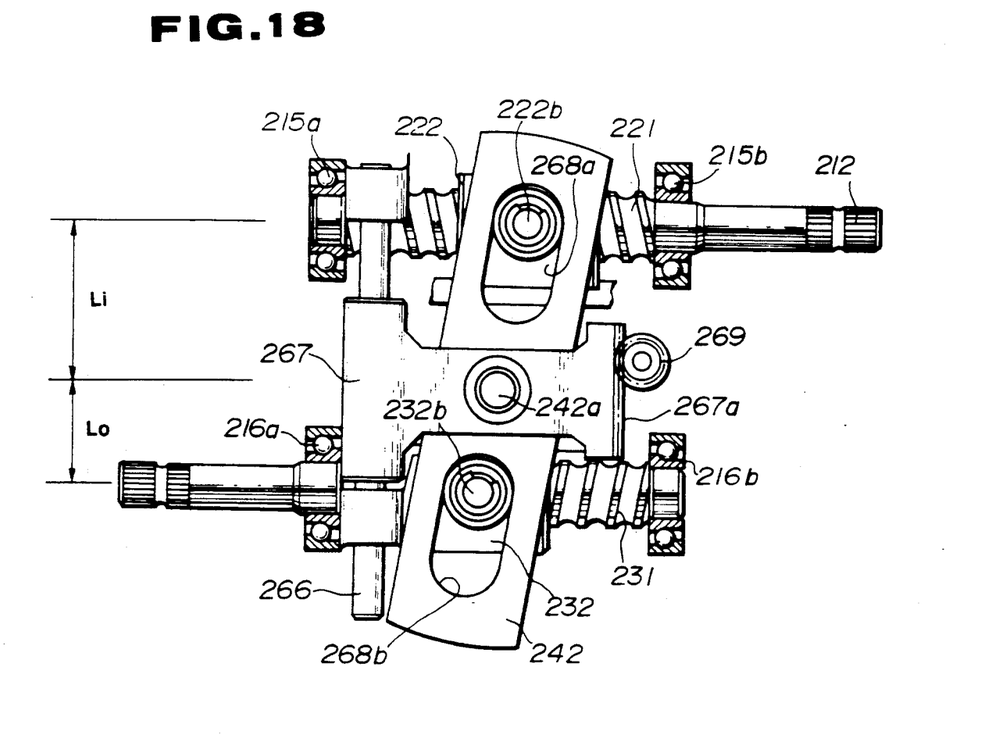

As shown in FIG. 15, input and output shafts 212, 214 are rotatably supported on a case 211 parallel to each other. The variable ratio steering system according to the third embodiment includes two guide rods 266 (FIG. 16) disposed parallel to each other in a case 211, and a substantially U-shaped support 267 (FIG. 15) movably supported on the guide rods 266. The support 267 has a rack 267a on a righthand end thereof. A swing member 242 is of an elliptical shape as viewed in side elevation (FIG. 16), and has a pair of support shafts 242a projecting outwardly transversely from a longitudinal central region thereof. The support shafts 242a are rotatably supported in central regions of the support 267. The swing member 242 also has vertically oblong holes 268a, 268b (FIG. 15) defined in a peripheral wall thereof above and below a central axis interconnecting the support shafts 242a. The oblong holes 268a, 268b loosely receive respective trunnions 222b, 232b projecting from nuts 222, 232 of respective first and second ball screw mechanisms 220, 230 mounted on the input and output shafts 212, 214, respectively. The rack 267a is held in mesh with a pinion 269 that is rotatable in unison with a worm wheel 270. The worm wheel 270 is held in mesh with a worm 250a fixedly mounted on the rotatable shaft of a drive motor 250.

The drive motor 250 is controlled in the same manner as the drive motor 50 is controlled in the first embodiment described above. When the drive motor 250 is energized, the support 267 is moved along the guide rods 266, thus moving the swing member 242 therewith. When the vehicle speed is lower, the swing member 242 is shifted toward the input shaft 212, i.e., upwardly in FIG. 17, and the input arm length Li between the support shafts 242a and the trunnion 222b of the nut 222 of the first ball screw mechanism 220 is adjusted to be smaller than the output arm length Lo between the support shafts 242a and the trunnion 232b of the nut 232 of the second ball screw mechanism 230 for a greater steering angle ratio. Conversely, when the vehicle speed is higher, the swing member 242 is shifted toward the output shaft 214, i.e., downwardly in FIG. 17, and the output arm length Lo between the support shafts 242a and the trunnion 232b of the nut 232 of the second ball screw mechanism 230 is adjusted to be smaller than the input arm length Li between the support shafts 242a and the trunnion 222b of the nut 222 of the first ball screw mechanism 220 for a smaller steering angle ratio.

While the steering angle ratio is varied depending on the vehicle speed in the above embodiments, the steering angle ratio may be manually varied.

As described above, the nuts of the two ball screw mechanisms that are disposed in series in the steering force transmitting path between the steering wheel and the steering gear mechanism, and are operatively coupled to each other by the swing member. The arm lengths from the point about which the swing member is swingable to the nuts are varied to vary the steering angle ratio. The variable ratio steering system can hold the neutral positions of the steering wheel and the steerable road wheels in conformity with each other at all times, and also can transmit steering forces reliably from the steering wheel to the steerable road wheels for reliable steering operation.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A variable ratio steering system on a motor vehicle having a steering wheel and steerable road wheels, comprising:
    an input shaft coupled to the steering wheel, said input shaft having a first threaded section;
    a first ball screw mechanism including a first nut threaded through balls over said first threaded section;
    an output shaft coupled to the steerable road wheels, said output shaft having a second threaded section;
    a second ball screw mechanism including a second nut threaded through balls over said second threaded section; and
    steering angle ratio adjusting means, mechanically coupled to said first and second nuts, for varying the ratio of an axial displacement of said second nut to an axial displacement of said first nut.

2. A variable ratio steering system according to claim 1, wherein said steering angle ratio adjusting means includes a swing member swingable in a direction substantially parallel to said input and output shafts about an axis lying in a plane transverse to the input and output shafts, said first and second nuts being coupled to respective different portions of said swing member, said steering angle ratio adjusting means comprising means for varying the distance between said axis about which said swing member is swingable and at least one of said different portions to which said first and second nuts are coupled.

3. A variable ratio steering system according to claim 2, wherein said swing member has at least one circular hole, one of said first and second ball screw mechanisms and a portion of said input or output shaft being axially inserted in said circular hole, said portion of the swing member to which the nut of said one of the first and second ball screw mechanisms is coupled being circumferentially movable along an inner surface of said circular hole.

4. A variable ratio steering system according to claim 3, wherein said portion of the swing member to which the nut of the other of the first and second ball screw mechanisms is coupled is fixedly disposed on an outer surface of said swing member.

5. A variable ratio steering system according to claim 4, wherein said portions of the swing member to which the nuts of said first and second ball screw mechanisms are coupled, respectively, are disposed on one side of said axis about which said swing member is swingable.

6. A variable ratio steering system according to claim 4, wherein said input and output shafts are disposed coaxially with each other.

7. A variable ratio steering system according to claim 2, wherein said swing member has two circular holes, said first and second ball screw mechanisms and portions of said input and output shafts being axially inserted in said circular holes, respectively, said portions of the swing member to which the nuts of said first and second ball screw mechanisms are coupled being circumferentially movable along respective inner surfaces of said circular holes.

8. A variable ratio steering system according to claim 7, wherein said portions of the swing member to which the nuts of said first and second ball screw mechanisms are coupled, respectively, are disposed on opposite sides, respectively, said axis about which said swing member is swingable.

9. A variable ratio steering system according to claim 7, wherein said input and output shafts are disposed parallel to each other.

10. A variable ratio steering system according to claim 7, wherein said portions of the swing member to which the nuts of said first and second ball screw mechanisms are coupled are circumferentially movable in mutually opposite directions.

11. A variable ratio steering system according to claim 2, wherein said swing member has a hole, said first and second ball screw mechanisms and portions of said input and output shafts being axially inserted in said hole, said portions of the swing member to which the nuts of said first and second ball screw mechanisms are coupled being arranged to allow said swing member together with said axis to move transversely to said input and output shafts parallel to a plane in which said input and output shafts lie.

12. A variable ratio steering system according to claim 11, wherein said first and second nuts of the first and second ball mechanisms have respective shafts projecting radially outwardly and extending parallel to said axis, said swing member having oblong holes defined in a peripheral wall around said hole, said shafts of the nuts being received in said oblong holes, respectively, said oblong holes extending in a direction to allow said swing member to move transversely to said input and output shafts parallel to said plane.

13. A variable ratio steering system according to claim 11, wherein said portions of the swing member to which the nuts of said first and second ball screw mechanisms are coupled, respectively, are disposed on opposite sides, respectively, said axis about which said swing member is swingable.

14. A variable ratio steering system according to claim 11, wherein said input and output shafts are disposed parallel to each other.

15. A variable ratio steering system according to claim 1, wherein said steering angle ratio adjusting means comprises means for varying the ratio of the axial displacement of said second nut to the axial displacement of said first nut depending on a speed at which the motor vehicle travels.

16. A variable ratio steering system according to claim 2, wherein said swing member has at least one circular hole, at least one of said first and second ball screw mechanisms and a portion of said input or output shaft being axially inserted in said circular hole, said portion of the swing member to which the nut of said one of the first and second ball screw mechanisms is coupled being circumferentially movable along an inner surface of said circular hole.

* * * * *